United States Patent [19]
Jackson

[11] 3,839,203
[45] Oct. 1, 1974

[54] DEMONSTRATION FILTER LIQUID CONTROL CIRCUIT

[76] Inventor: Clifford E. Jackson, 10 Brant St. E., Orillia, Ontario, Canada

[22] Filed: June 18, 1973

[21] Appl. No.: 370,942

[52] U.S. Cl................ 210/104, 210/196, 210/391
[51] Int. Cl........................................... B01d 33/06
[58] Field of Search ............ 310/97, 104, 391, 196; 73/38

[56] References Cited
UNITED STATES PATENTS
2,932,402   4/1960   Logue et al.......................... 210/391
3,478,601  11/1969   Niebergall.............................. 73/38

*Primary Examiner*—Roy Lake
*Assistant Examiner*—R. Daniel Crouse
*Attorney, Agent, or Firm*—Westell & Hanley

[57] ABSTRACT

In a liquid circuit for a demonstration filter, the filtered liquid is intermittently stored and released back to the filter.

2 Claims, 2 Drawing Figures

PATENTED OCT 1 1974 3,839,203

DEMONSTRATION FILTER LIQUID CONTROL CIRCUIT

This invention relates to a fluid and solid circuit for a demonstration filter.

The circuit to be described provides for the continuous flow of liquids and solids to and from a demonstration filter. In the demonstration filter a solid-liquid mixture is filtered so that a liquid filtrate is separated from solids which have been separated from the solids by a filter material. The inventive circuit provides means for continuously running a demonstration with such a filter. Within the scope of various aspects of the invention, these means may include: the means for supplying to the filter a mixture of solids and liquids to be filtered, means for controlling the travel of filtrate separated by the filter to a chamber where solids and liquids are mixed and location of the latter chamber to receive solids detached during the mixing process.

Figure 2:
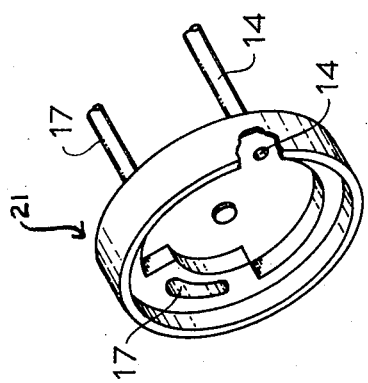
Figure 1:
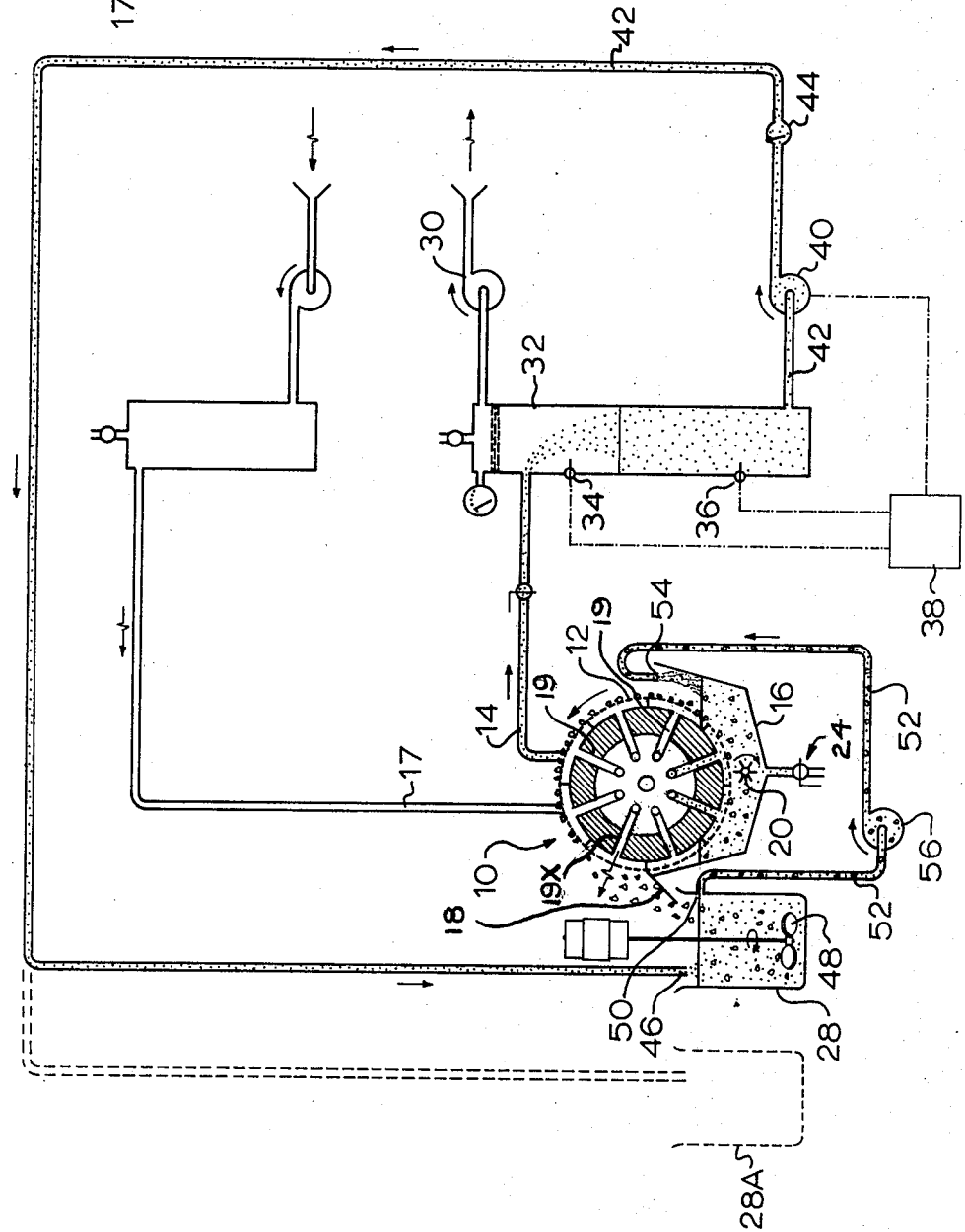

FIG. 1 shows a schematic representation of a vacuum filter with which the inventive circuit may be used, coupled to a schematic representation of the liquid and solid circuit forming the subject matter of this invention; and FIG. 2 shows a detail of the end cap for the filter.

In the drawings, the rotary vacuum filter schematically shown at 10 may be of any conventional design whose operation it is desired to demonstrate. Thus the filter may be of small size and principally of transparent materials suitable for table or bench mounting — or may be larger size although this will considerably increase expense. The filter, in accord with well-known operating principles for vacuum filters, will be provided with a rotating drum, shown in end view partially immersed (usually to a location just below the axis of rotation) in the liquid and solid mixture to be filtered, which is contained in a tank 16. A filtering material, schematically shown at 12, surrounds the cylindrical periphery of the drum and the drum just inwardly of this material is usually divided into a plurality of sections which receive the liquid filtrate passing through the filter material. A plurality of radially extending conduits 19 are provided with one conduit extending to each section and to a coupling plate (not shown) at one of the axial ends. The coupling plate, rotating with the filter, cooperates with a stationary plate 21 to provide coupling of those conduits 19 which from time to time run to sectors immersed in liquid, to a vacuum line 14 and cooperates with such stationary plate to connect at least one of those sectors which is on the descending portion of the non-immersed portion of the drum (conduit 19X of the drawing), to a pressure line 17. The action of the pressure line 17 is to blow outwardly through the relevant conduit, and through the filter material and to detach the filtered out solids or 'filter cake' from the filter material. Filter cake or the filter material is also detached by a scraper and/or deflector and deflected out of the filter. A combined scraper and deflector is here schematically shown at 18.

Although the air blow, the scraper and the deflector are all useful implements used in full scale filters and hence susceptible to demonstration, the presence or absence of one or more does not go to the essence of the invention claimed herein which is not concerned with the filter but with the liquid and solid circuitry combined therewith.

An agitator for the materials is schematically shown at 20 and a drain line with valve for the liquid in tank 16 is shown at 24.

In accord with the invention the liquid-solid circuit for operation with the filter, includes a reservoir 28 acting as a mixing chamber, located to receive the filtered-out solids from the deflector 18.

A vacuum pump 30 maintains a predetermined degree of vacuum in a tank 32 preferably having its major dimension vertically disposed. A pair of electrical sensors 34 and 36 of any desired design are connected to a control 38. Vacuum line 14 is connected to conduct liquid into tank 32 above the level of both sensors 34 and 36. The control is connected, responsive to the sensors, to control the operation of a pump 40. The pump 40 is connected to pump in a line 42 from adjacent the bottom of tank 32 to an open end 46 designed to open into reservoir 28. The control is designed to maintain the liquid in the tank between the levels of the two sensors 34 and 36. Thus the control 38 is designed so that the upper sensor 34 actuated by a rising liquid level will cause the pump to be turned on but the control is also designed so that the pump, thus turned on will remain actuated until the liquid level falls below the level of the lower sensor 36. The pump will thus be actuated to maintain the level of the liquid between the two sensor levels. The sensor levels may of course be altered as desired. A more consistent level control although with more strain on the pump motor may of course be provided by a single sensor level which is designed to turn the motor on above and off below the sensor level. One of the great advantages of the two level operation shown is that the time taken to fill the tank 32 from the level of 36 to the level of element 34 is a measure of the flow of liquid through the filter. Thus by exactly determining the volume of liquid between the level of 36 and the level of 34 and timing the rise of liquid from the level of the former to the level of the latter, the rise in liquid level may be determined. If desired, a flow indicator 44 may be provided to indicate flow in conduit 42. As previously implied, the liquid filtrate pumped by pump 40 is carried by conduit 42 to be released into reservoir 28 for return to the filter tank 16. (In any arrangement where it is desired to use a different supply for the tank 16, or to render the circuit non re-entrant, the conduit 42 with its opening 46 may be directed into a separate container 28A as indicated by the dotted container and conduit.

A mixer 48 is provided to mix, for reintroduction into the filter, the filtrate received through conduit 42 and the solids received from the filter, preferably from deflector 18.

An outlet 50, resembling an overflow pipe in function located near the top of reservoir 28 effectively sets the upper limit of the liquid therein. Conduit 52 is connected from outlet 50 to an outlet 54 just above the level of liquid in tank 16. A pump 56 in the conduit pumps liquid appearing therein into the filter tank. The pump 56 may be continuously run since no liquid will be pumped when the level in reservoir 28 falls below that of the inlet 50 of conduit 52. The level of liquid in filter tank 16 should be maintained below the level of the conduit opening 54. This may be achieved by design of the conduit outlet and in addition an overflow drain (not shown) may be provided if necessary from the filter tank back to the mixing chamber.

Applicant does not wish to be limited by specific examples given or elements set out in the specific embodiment described and intends to be limited only by the claims appended hereto.

I claim:

1. Liquid and solid circuit for demonstration vacuum filter, which filter is provided with a tank for retaining a liquid-solid mixture to be filtered, a rotating drum filter mounted to have its lower portion immersed in liquid in said tank, said filter being of the type having:

a vacuum conduit connectable outside of said filter, designed to remove filtrate from the inside of said filter when an exterior vacuum is applied thereto, a pressure conduit connectable outside of said filter designed to provide an air flow outward through those portions of the filter material from time to time above the liquid level in said tank, means, including said air flow for depositing outside said filter, solids filtered by said drum filter out of a liquid-solid mixture in said tank, the liquid and solid circuit comprising:

a supply conduit for supplying a liquid-solid mixture to said tank, means connecting said pressure conduit to a source of gas under pressure, means connecting said vacuum conduit to a chamber, means for creating a vacuum in said chamber, said chamber being designed to store liquid withdrawn from said filter chamber, a pump connected to pump liquid from said vacuum chamber, when the liquid level therein is above a predetermined amount and not to pump when said level is below a predetermined amount, a reservoir located to receive liquid pumped from said vacuum chamber, said reservoir being located to receive solids filtered by said drum filter and deposited outside said filter, means in said reservoir for causing mixing of said liquid and said solid, an exit from said reservoir at a predetermined height therein, said supply conduit leading from said exit to the filter tank, and a pump in said supply conduit operable to pump liquid reaching the level of said exit into said tank.

2. Liquid and solid circuit for demonstration vacuum filter, said filter being designed to receive a mixture of liquids and solids, and to separate such mixture into solids and liquids, a conduit arranged so that separated liquid may be removed by vacuum applied along a conduit and means for depositing solids separated by filtration in a predetermined location, said circuit comprising:

a supply conduit for supplying liquid-solid mixture for separation by said filter;

means connecting said vacuum conduit to a chamber, means for creating a vacuum in said chamber, said chamber being designed to store liquid withdrawn from said filter, a pump connected to pump liquid from said vacuum chamber when said liquid exceeds a predetermined height in said chamber, a a reservoir located to receive liquid pumped from said vacuum chamber, said reservoir being located in said predetermined location to receive solids separated by filtration, said supply conduit being located to receive liquids and solids from said reservoir and means causing the flow of liquids and solids from said reservoir along said conduit to said filter.

* * * * *